United States Patent [19]

Turini et al.

[11] 4,184,107
[45] Jan. 15, 1980

[54] CONTROL CIRCUIT FOR A PREDETERMINED ANGULAR MOVEMENT OF A DC MOTOR

[75] Inventors: Gerhard Turini, Maisach; Wolfgang v. Tluck, Olching, both of Fed. Rep. of Germany

[73] Assignee: Siemens Aktiengesellschaft, Berlin & Munich, Fed. Rep. of Germany

[21] Appl. No.: 837,583

[22] Filed: Sep. 28, 1977

[30] Foreign Application Priority Data

Apr. 13, 1977 [DE] Fed. Rep. of Germany ....... 2716411

[51] Int. Cl.$^2$ .............................................. G05B 5/01
[52] U.S. Cl. .................................. 318/467; 318/611; 318/626; 318/640
[58] Field of Search ............... 318/260, 263, 467, 468, 318/640, 611, 626

[56] References Cited

U.S. PATENT DOCUMENTS

| | | | |
|---|---|---|---|
| 3,560,829 | 2/1971 | Brennan | 318/681 X |
| 3,729,668 | 4/1973 | Brette | 318/681 X |
| 3,989,992 | 11/1976 | Schmidt | 318/263 X |
| 4,079,298 | 3/1978 | Prager | 318/260 |

*Primary Examiner*—B. Dobeck
*Attorney, Agent, or Firm*—Hill, Van Santen, Steadman, Chiara & Simpson

[57] ABSTRACT

An apparatus to produce accurately limited angular or pivotal movements of a shaft of a DC motor with a control circuit to supply appropriate signals to control the operation thereof. Position indicators are provided to detect the shaft position and a second indicator is located to detect a rearward pivot position. Means are provided to establish a direction signal to indicate direction of rotation of the shaft, and the direction signal means and the position indicators produce outputs which are connected to the control circuit. The DC motor has a motor drive which receives signals from the control circuit during movement of the motor between forward and rearward pivot positions. The control circuit produces, first, an acceleration current and then a deceleration and finally a correction current with the current dropping to "zero" when the desired angular position has been reached by the shaft.

6 Claims, 12 Drawing Figures

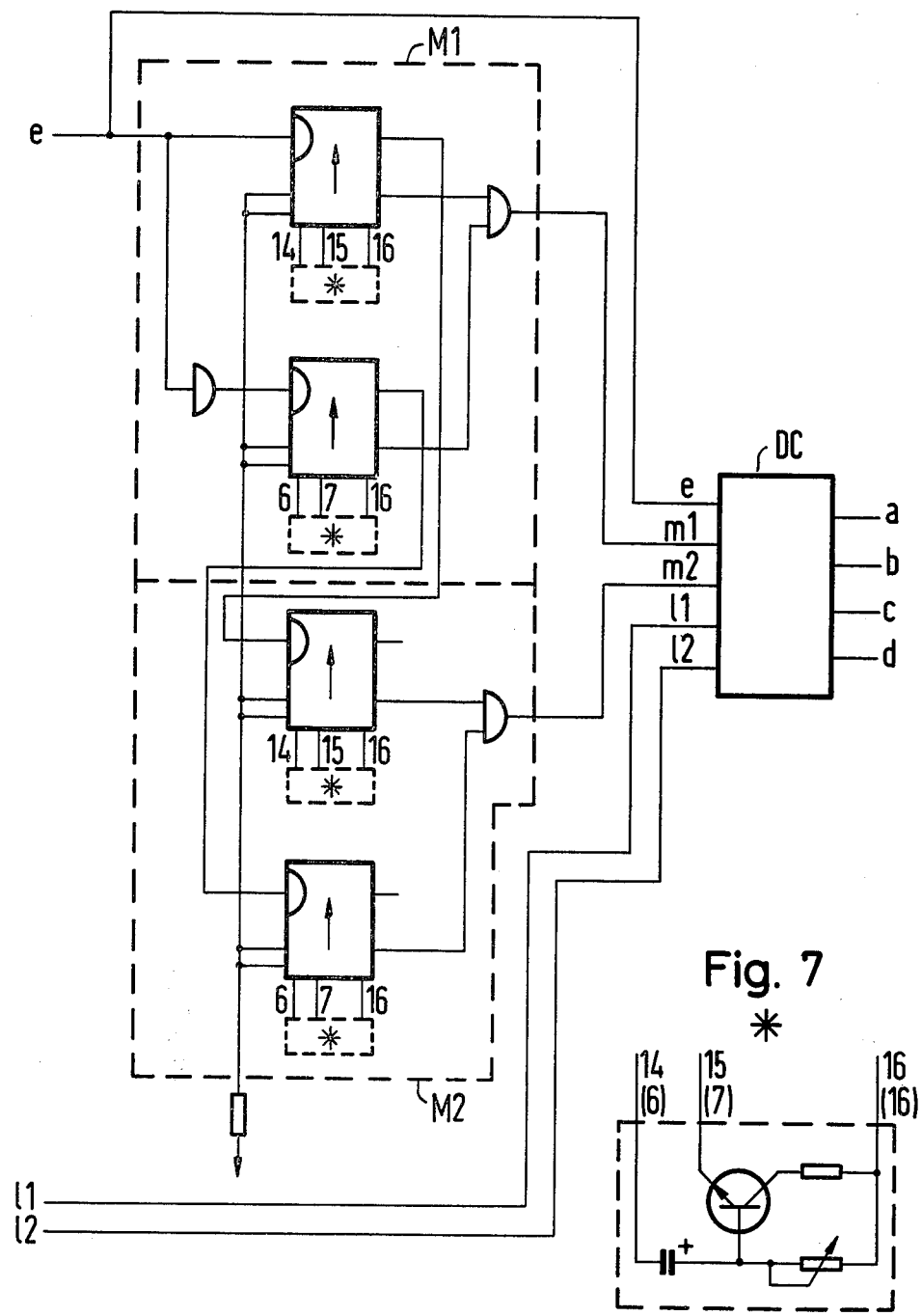

CONTROL CIRCUIT FOR A PREDETERMINED ANGULAR MOVEMENT OF A DC MOTOR

FIELD OF THE INVENTION

The field of art to which this invention pertains is motor control circuits and in particular to a motor control circuit together with appropriate position indicators to control the movement of a motor through a precise restricted angle causing the motor to initiate and cease rotation when the shaft reaches the desired position.

SUMMARY OF THE INVENTION

It is an important feature of the present invention to provide an improved control circuit for the rotary movement of a motor about a predetermined angle.

It is another feature of the present invention to provide a control arrangement for the precise rotary movement of a DC motor through a predetermined angle using a combination of direction signals and position indication signals.

It is also a feature of the present invention to provide a device for angular movement through a predetermined angle wherein a motor control circuit provides an acceleration signal, a deceleration signal, and a correction signal to control the angular movement of the motor.

These and other objects, features and advantages of the present invention will be understood in greater detail from the following description and the associated drawings wherein reference numerals are utilized to designate preferred embodiments.

BRIEF DESCRIPTION OF THE DRAWINGS

FIGS. 6 and 7 illustrate other forms of the control circuit.

DESCRIPTION OF THE PREFERRED EMBODIMENTS

Figure 1:
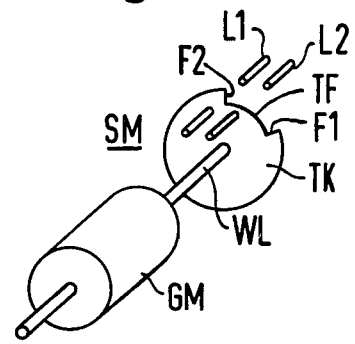
FIG. 1 is a perspective of a DC motor and associated position indicators according to the present invention.

This invention relates to an arrangement to develop a rotary movement of a shaft about a predeterminable angle with the aid of a DC motor. Such arrangements are employed in cases where a mechanical device must be pivoted between first and second positions. For example, in non-mechanical printing, it is necessary to fix the toner images applied to a paper web by passing it between two fixing rollers, one of which is heated, in a fixing station. The second roller serves to press the paper web against the heated roller. When there is an interruption in the printing, it is necessary for the second roller to be pivoted away from the first roller. The pivoted movement of the second roller can be carried out with the aid of the abovementioned arrangement.

A goal of this invention is to provide such an arrangement which represents an economical system for applications which have average requirements for speed and accuracy. This goal is realized in part by using position indicators, a first of which is assigned to a first position of the DC motor and a second is assigned to a second position of the DC motor, the second position being displaced from the first by a predeterminable angle. The outputs of the position indicators are connected to a control circuit which is also supplied with a direction signal indicative of the direction of rotation of the DC motor. The control circuit then produces control signals for the motor drive to cause the motor to carry out its required movement. The control signals include an acceleration current, a deceleration current, and in the region of the final position, a correction current. When the desired current is reached, the current drops to "zero".

The control circuit is expediently designed in such manner that when a direction signal is received, firstly, the acceleration current is applied to the motor and when an angle representing a portion of the predetermined angle of rotation has been passed, a switch-over is made from acceleration current to deceleration current (reversal of polarity). When the desired position is reached, the position indicator emits a position signal, and consequently, a switch-over is made from deceleration current to holding current. The motor comes to a halt in the desired position, which it maintains so long as no change occurs in the direction signal.

To enable the motor to be brought to a halt in the desired position, it is necessary to determine the time and angle value for the switch-over from acceleration current to deceleration current with some degree of accuracy. To accomplish this, a monostable trigger stage can be employed which is started when the acceleration current is applied to the motor, and having a triggering action which is employed to switch-over to a deceleration current. The optimum triggering time is expediently determined empirically under an operational motor load.

In the desired position, the position indicator interprets a specific, small angle in such manner that the motor is de-energized, and thus maintains its position so long as no deflecting forces occur. If this angle is exceeded in either direction, the position indicator connects to the motor a correction current having a polarity which is designed to turn the motor back to the desired position. The correction current is selected to be lower than the acceleration or deceleration current. There are various explanations for deviations from the desired position. The motor may either not entirely have reached or have overshot the desired position on deceleration, or having already reached the end position, it may have been moved by an external force.

If an opposite direction signal arrives, the arrangement operates similarly in the other direction.

In the case where the motor load is not constant, i.e., when the torque required of the motor can be lower on one actuation and greater with another actuation, occasionally it is better to use the angle of rotation rather than the time as the factor for switch-over to deceleration current. For this purpose, an additional position indicator is employed whose optimum angle position is empirically determined under an average motor load.

The position indicators can be constructed with two optical sensors and with a pulse train disc which is arranged on the shaft of the DC motor. The pulse train disc contains a pulse train window which is scanned by the optical sensors. The position of the DC motor, which will herein be referred to as the forward-pivot position, is reached when one flank of the pulse train window lies between the two optical sensors with the first optical sensor not being interrupted, and the second optical sensor being interrupted. The second position, which will herein be referred to as rearward-pivot position, is reached when the flank of the pulse train window lies between the two optical sensors with the first optical sensor being interrupted and the second optical sensor not being interrupted. In this way, from the position signal emitted by the optical sensors, it is possible to establish which position the DC motor has assumed.

The motor drive can consist of an H-circuit using four power transistors. The collector-emitter-paths of two of the power transistors are connected in series between a first and a second operating potential. The DC motor is arranged between the connection points of the series-connected collector-emitter-paths of these power transistors. Thus a current flows in one direction through the DC motor when the one set of diagonally arranged power transistors are rendered conductive, and current flows in the opposite direction through the DC motor when the other set of diagonally arranged power transistors are rendered conductive.

The lower value of the correction current can be obtained by placing the collector-emitter-path of one of the power transistors in parallel with a resistor and providing that the power transistor remains off when the diagonally arranged power transistor is rendered conductive.

The control circuit can consist of monostable trigger circuits and a decoder circuit. The monostable trigger circuits produce output signals having a duration which determines the duration of the acceleration and deceleration currents. The decoder circuit is supplied with output signals from the monostable trigger stages, the direction signal, and the position signals. From these signals, it produces the control signals for the motor drive. The decoder circuit can be designed as a programmable store.

In a further development of the arrangement in accordance with the invention, the duration of the acceleration and deceleration currents are not pre-programmed, but are controlled in a path-dependent manner by an additional motion pick-up. For this purpose, a third optical sensor can be arranged in the region of the pulse train disc. Between the monostable trigger circuit and the decoder circuit there is then arranged a forward-backward counter which, driven by a timing signal, counts in the forward direction following the occurrence of a flank of the direction signal, and in fact until the third optical sensor emits a signal. From this time onwards, the forwards-backwards counter again counts backwards, and when the count 0 is reached, the output signal of the first monostable trigger stage is disconnected. Thus, the time at which the output signal of the first monostable trigger circuit is disconnected is dependent upon the mechanical load of the motor.

Referring to the drawings in greater detail, FIG. 1 is an illustration of the DC motor and of the position indicators. The DC motor is referenced GM, and the position indicators are referenced SM. The position indicators SM consist of a pulse train disc TK and two optical sensors L1 and L2. The pulse train disc Tk is arranged on a shaft WL of the DC motor GM. It possesses a pulse train window TF with two flanks F1 and F2.

Figure 2:
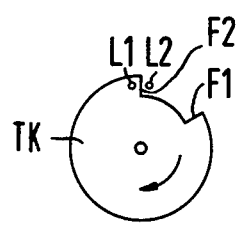
FIGS. 2 and 3 illustrate two different positions for the position indicators.
Figure 3:
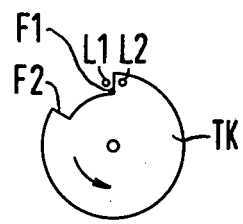

Depending on which flank of the pulse train window TS lies between the optical sensors L1 and L2, and which of the two optical sensors L1 and L2 is interrupted and not interrupted, the forward-pivot position and rearward pivot position are determined. For example, the forward-pivot position can be defined in such manner that the window flank F1 lies between the optical sensors L1 and L2 with the optical sensor L2 being interrupted and the optical sensor L1 not being interrupted (FIG. 3). In this case, the rearward-pivot position is defined as occuring when the window flank F2 lies between the two optical sensors L1 and L2 and the optical sensor L2 is not interrupted but the optical sensor L1 is interrupted (FIG. 2). The arrows in FIGS. 2 and 3 indicate in which direction the pulse train disc TK is rotated when a transition occurs from the represented position into the other position. If a rotation is to be made from the forward-pivot position (FIG. 3) to the rearward-pivot position (FIG. 2), the pulse train disc TK rotates in the anti-clockwise direction. If, on the other hand, the pulse train disc TK is to move from the rearward-pivot position (FIG. 2) to the forward-pivot position (FIG. 3), it rotates in the clockwise direction.

Figure 4:
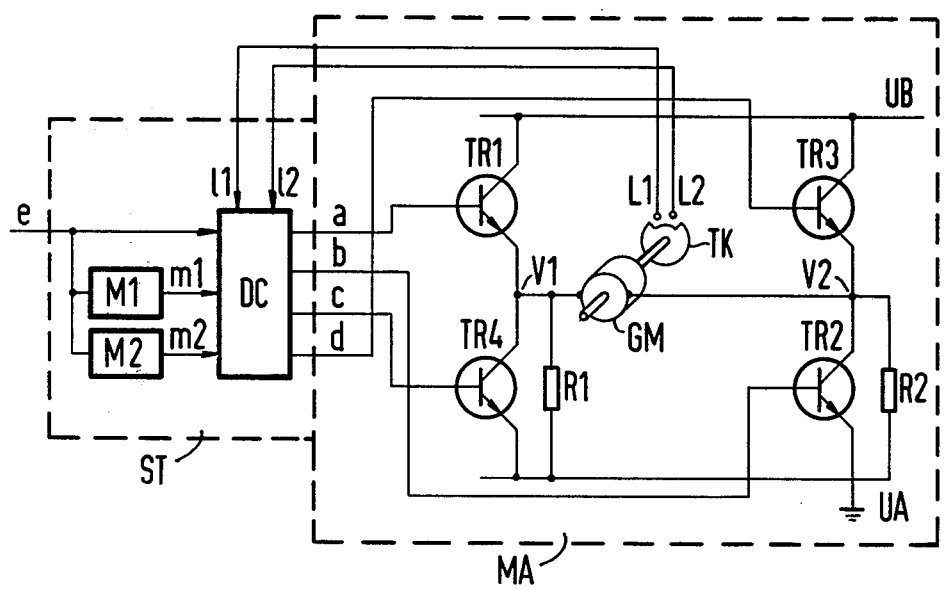
FIG. 4 shows a control circuit and the associated motor drive for the DC motor.

FIG. 4 illustrates the design of the control circuit and of the motor drive for the DC motor. The control circuit is referenced ST, and the motor drive MA.

The motor drive MA is constructed as an H-circuit comprising four power transistors TR1 to TR4. The base terminals of these power transistors TR1 to TR4 are supplied with control signals a, b, c, d from the control circuit ST. The collector-emitter-paths of two power transistors are connected in series and lie between a first operating potential UB and a second operating potential UA. For example, the collector-emitter-paths of the power transistors TR1 and TR4 are connected in series, as are the collector-emitter-paths of the power transistors TR3 and TR2. The DC motor GM is connected to the junction point of the series-connected collector-emitter-paths of two power transistors. One junction point is referenced V1, and the second junction point V2. One brush of the DC motor GM is connected to V1, and the second brush to V2. Resistors R1, R2 are also arranged in parallel with the collector-emitter-path of the power transistor TR4 and the collector-emitter-path of the power transistor TR2 respectively.

The direction of current through the DC motor GM as determined by the motor drive MA establishes the direction of rotation. If, for example, the power transistor TR1 is rendered conductive, a current having the operating potential UB flows through the power transistor TR1 to the motor GM in the indicated direction. If, on the other hand, the power transistor T3 is rendered conductive, a current of the operating potential UB flows via the power transistor TR3 to the DC motor GM in the opposite direction.

The magnitude of the current which flow across the DC motor is dependent upon whether the transistors TR2, TR4, which are arranged diagonally to the transistors TR1 and TR3 are likewise rendered conductive. In this way it is possible to produce two currents of different magnitude, each of which can also possess two different directions. When two cooperating power transistors which are arranged diagonally to one another are rendered conductive, a current of high magnitude flows, whereas when only one power transistor is rendered conductive which is not connected in parallel with a resistor R1,R2, the current which flows through the DC motor is of a lower magnitude. The currents of high magnitude which flow through the DC motor GM are referred to either as acceleration or deceleration currents in dependence upon whether they are used for accelerating or decelerating the motor. The currents of low magnitude which flow through the DC motor GM are referred to as correction current (forward) or correction current (backward) in dependence upon whether they produce a movement of the DC motor in the pivot direction or the counter pivot direction.

The control circuit ST consists of two monostable trigger circuits M1 and M2 and a decoder circuit DC. The monostable trigger circuits M1 and M2 are supplied with a direction signal e which is also directly applied to the decoder circuit DC. The monostable trigger circuits M1 and M2 emit output signals m1 and m2 which commence with the flank of the direction signal and end at a time which can be determined by the trigger times of the trigger circuits. For such time as the output signals m1 and m2 from the monostable trigger circuits M1 and M2 are present, an acceleration current is transmitted through the DC motor GM.

At the expiration of the trigger time m1, only the monostable trigger circuit M2 emits a signal m2, whose duration can be determined by the trigger time of the monostable trigger circuit M2. During the length of time in which only the signal m2 is present, the DC motor GM is supplied with a deceleration In addition to the signals e, m1, m2, the decoder circuit DC is also supplied with the position signals from the optical sensors L1 and L2. These are referenced 1(1) and 1(2). The control circuit ST is designed in such manner that the position signals 1(1) and 1(2) do not become effective until the signals m1 and m2 have expired and therefore, as a result of the rotation of the DC motor GM, the pulse train disc TK has moved into the region of the forward-pivot position or the rearward-pivot position. The position signals 1(1) and 1(2) are previously suppressed.

In this way the acceleration current through the DC motor GM is determined in respect of direction by the direction signal e and in respect of duration by the signal m1. The deceleration current through the DC motor GM is determined by means of the direction signal e and the signal m2. The correction current (forward and backward), on the other hand, is determined in dependence upon the direction signal e, the signals m1 and m2, and the position signals 1(1) and 1(2).

The function of the control circuit ST and of the motor drive MA will be explained making reference to the pulse diagram in FIG. 5 in which voltages and an angle of rotation $\phi$ are plotted in dependence upon the time t. The individual curves have been referenced at their start with the signals for the circumstance shown in FIG. 3. Here a high potential signifies that the power transistors TR1 to TR4 are conductive. A high potential can be equated with a binary "1", whereas low potential can be equated with a binary "0".

Figure 5:
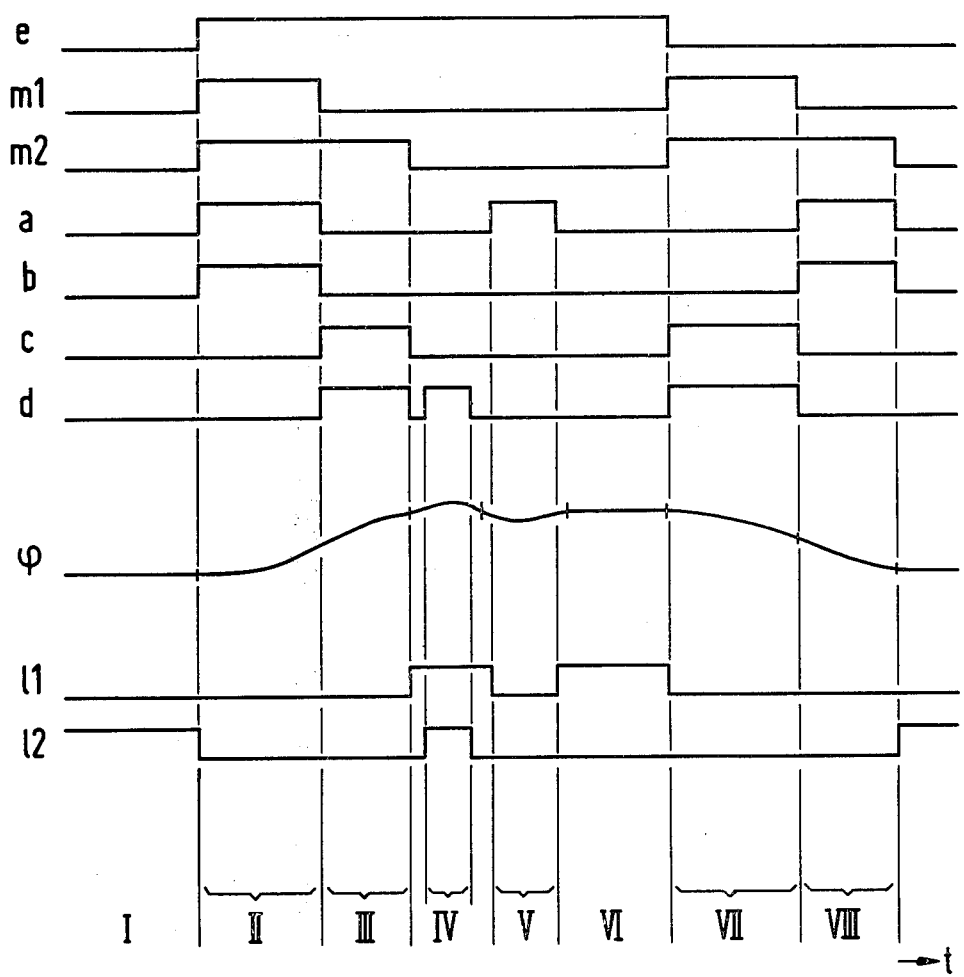
FIG. 5 is a pulse diagram illustrating pulse signals which occur in the control circuit.

FIG. 5 firstly represents the forward-pivot process. In a zone I, the pulse train disc TK occupies the outwards-pivot position. Consequently the optical sensor L2 is illuminated, and the position signal 1(2) is "1", whereas the optical sensor L1 is interrupted and the position signal 1(1) is "0". No current flows through the DC motor GM.

In the zone II, the direction signal e is switched from "0" to "1". At the same time the output signals M1 and m2 from the monostable trigger circuits M1 and M2 likewise pass from "0" to "1". The decoder circuit DC subsequently emits the control signals a and b from its output. The latter render the power transistors TR1 and TR2 conductive, and a current, the acceleration current, can flow via the power transistor TR1, the DC motor GM, and the power transistor TR2. The DC motor GM begins to move, and this is represented by the curve for the angle of rotation $\phi$. Following a period of time which can be determined by the trigger time of the monostable trigger circuit M1, the signal m1 changes back to "0". Thus the acceleration zone II in FIG. 5 is ended. The control signals a and b again return to "0". Until now, the position signals 1(1) and 1(2) have played no role.

Zone II is followed by zone III, in which only the monostable trigger circuit M2 emits a signal m2. This signal causes the decoder circuit DC to emit control signals c and d which render the power transistors TR3 and TR4 conductive. Consequently, current flows in the opposite direction through the DC motor GM; this is the deceleration current. The duration of the deceleration current is again determined by the trigger time of the monostable trigger circuit M2. When the signal m2 again returns to "0", the power transistors TR3 and TR4 are blocked and a deceleration current no longer flows through the DC motor GM. Also in this zone III, the position signals 1(1) and 1(2) are not operative.

The duration of the acceleration current and of the deceleration current are selected to be such that the flank F1 of the pulse train disc has reached the region of the optical sensors L1 and L2. A position signal 1(1) appears, as the optical sensor L1 is no longer interrupted. Thus the DC motor has obviously reached the correct position. If, however, the DC motor continues to rotate, the optical sensor L2 is also released, and a position signal 1(2) appears. That zone of FIG. 5 in which a position signal 1(2) also occurs is marked IV. When the position signal 1(2) occurs, the decoder circuit DC produces a control signal d which renders the power transistor TR3 conductive. As a result, a current—the so-called correction current (backward)—can flow across the power transistor TR3, the DC motor GM and the resistor R1. The magnitude of this correction current is lower than the deceleration current or acceleration current, and counteracts the rotation of the DC motor GM, and rotates the latter backwards until the optical sensor L2 is interrupted and the position signal 1(2) again becomes "0".

If the DC motor GM is rotated back too far, or, during the execution of the deceleration (zone III), has come to a halt too soon, the optical sensor L1 will also be interrupted and the position signal 1(1) will be "0" (zone V). In this case, the decoder circuit DC emits the control signal, a, which renders conductive the power transistor TR1. As a result a current flows across the power transistor TR1, the DC motor GM and the resistor R2. This current is referred to as a correction current (forward), and its magnitude corresponds to the correction current (backward). As a result of this current, the DC motor GM is slowly rotated in the forward direction, and in fact until the window flank F1 lies between the optical sensors L1 and L2. Thus the forward-pivot process is terminated, as, in the situation illustrated in FIG. 5, in zone VI no control signals are produced by the decoder circuit DC, and thus no current flows through the DC motor GM.

The rearward-pivot process is represented next. The rearward-pivoting process commences (zone VII) when the direction signal, e, becomes "0". The rear flank of the direction signal, e, again triggers signals m1 and m2 in the monostable trigger circuits M1 and M2. The direction signal, e, and the signals m1 and m2 from the monostable trigger circuits M1 and M2 cause the decoder circuit DC to emit the control signals c and d. As a result, the power transistors TR3 and TR4 are rendered conductive, and a current flows across the power transistor TR3, the DC motor GM and the power transistor TR4. This current constitutes the acceleration current. The position signals from the optical sensors L1 and L2 are not taken into account.

Following the signal m1 from the monostable trigger circuit M1, only the signal m2 is produced by the monostable trigger circuit M2 (zone VIII). This signal, together with the direction signal e, causes the decoder circuit DC to emit the control signals a and b. The result is that the power transistors TR1 and TR2 are rendered conductive. Thus a current flows in the opposite direction to the previous current across the power transistor TR1, the DC motor GM and the power transistor TR2. This current now constitutes the deceleration current.

The duration of the acceleration current and of the deceleration current is selected to be such that the window flank F2 comes to lie between the optical sensors L1 and L2. When the pulse train disc, and thus the DC motor GM, come to a halt, the rearward-pivot process is completed. If, however, the DC motor GM is to continue to move, the correct position of the motor and of the pulse train disc is set with the aid of the position signals 1(1) and 1(2) emitted from the optical sensors L1 and L2 in accordance with the execution of the forward-pivot process. These processes are no longer shown in FIG. 5.

The decoder circuit DC can be designed as a programmable store (PROM). This programmable store then possesses inputs for the direction signal e, the signals m1 and m2, and the position signal 1(1) and 1(2). It possesses outputs for each of the control signals a, b, c, d. The programming of the store is carried out in accordance with the following truth table.

| e | m1 | m2 | 1(1) | 1(2) | a | b | d | c |
|---|----|----|------|------|---|---|---|---|
| 1 | 1  | 1  | X    | X    | 1 | 1 | 0 | 0 |
| 1 | 0  | 1  | X    | X    | 0 | 0 | 1 | 1 |
| 1 | 0  | 0  | 0    | 0    | 1 | 0 | 0 | 0 |
| 1 | 0  | 0  | 0    | 1    | 1 | 0 | 0 | 0 |
| 1 | 0  | 0  | 1    | 0    | 0 | 0 | 0 | 0 |
| 1 | 0  | 0  | 1    | 1    | 0 | 0 | 1 | 0 |
| 0 | 1  | 1  | X    | X    | 0 | 0 | 1 | 1 |
| 0 | 0  | 1  | X    | X    | 1 | 1 | 0 | 0 |
| 0 | 0  | 0  | 0    | 0    | 0 | 0 | 1 | 0 |
| 0 | 0  | 0  | 0    | 1    | 0 | 0 | 0 | 0 |
| 0 | 0  | 0  | 1    | 0    | 0 | 0 | 1 | 0 |
| 0 | 0  | 0  | 1    | 1    | 1 | 0 | 0 | 0 |

The table contains "1" signals when the signal possesses a high potential in accordance with FIG. 5. The signals are given as "0" when they possess a flow potential in accordance with FIG. 5. If the position signals 1(1) and 1(2) are not taken into consideration, the truth table contains an "X" at the appropriate points. When the store is programmed in accordance with the truth table, the sequences already described in the explanation of FIG. 5 occur.

FIGS. 6 and 7 show a further possible embodiment of the control circuit ST. Here a programmable store (PROM) is employed as decoder circuit DC. The monostable trigger circuits M1 and M2 have also been shown. These each consist of two stages, of which one stage produces a signal when the front flank of the direction signal e is connected, whereas the other emits a signal when the rear flank of the direction signal e is applied. As the modules for the monostable trigger circuits M1 and M2 are commercially available, the arrangement illustrated in FIG. 6 will not be explained further. FIG. 7 represents an addition to the stages of the monostable trigger circuits M1 and M2 at the points marked with an asterisk (*).

Figure 8:
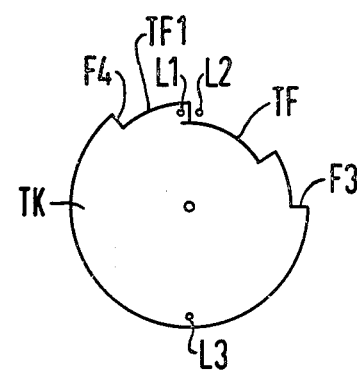
FIGS. 8 and 9 illustrate details of the position indicators.
Figure 9:
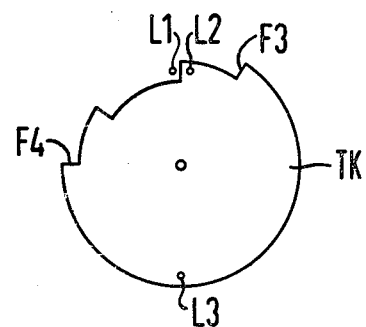

FIGS. 8 and 9 show the embodiment of the pulse train disc TK when the acceleration of the DC motor GM is controlled in path-dependent fashion. The pulse train disc TK is again arranged on a shaft of the DC motor GM. FIG. 8 represents the position of the pulse train disc TK relative to the optical sensors L1 and L2 when the DC motor GM occupies the rearward-pivot position, whereas FIG. 9 shows the position of the pulse train disc TK relative to the optical sensors L1 and L2 when the DC motor GM occupies the forward-pivot position.

In addition to the pulse train window TF, the pulse train disc TK now additionally possesses a second, larger window TF1 arranged above the pulse train window TF. This window TF1 possesses flanks F3 and F4. In addition to the optical sensors L1 and L2, which fulfill the same function as in the above described exemplary embodiment, a third optical sensor L3, a motion pick-up, is provided. The third optical sensor L3 is arranged opposite the optical sensors L1 and L2.

The optical sensor L3 is connected to a forward-backward counter which is supplied with a counting pulse train. The forward-backward counter is arranged between the monostable trigger circuit M1 and the decoder circuit DC.

At the beginning of the acceleration process for forward or rearward-pivoting, on the expiration of a re-established length of the signal m1, the forward-backward counter is started. As soon as the window flank F3 passes the optical sensor L3 during the forward-pivoting process, and the window flank F4 passes the optical sensor L3 during the rearward-pivoting process, the counter switches over from forward to backward operation. The signal m1' is switched over to "0" when the counter passes through the count of "zero".

The design in FIGS. 8 and 9 has the advantage that even in the case of considerable fluctuations in load, the arrangement is able to follow the control commands rapidly. If, for example due to greater friction in the mechanical section, the movement of the DC motor becomes slower, the forward-backward counter continues to count upwards until the window flank F3, F4 moves past the optical sensor L3. The forward-backward counter must therefore also count down until the count of "zero" is reached. This, however, results in the DC motor being accelerated for a longer period of time. With a favorable design it can be assured that the pivot movement about a specific angle is carried out in an approximately equal length of time in spite of a differing mechanical load, and that the desired end position is clearly adhered to.

Figure 10:
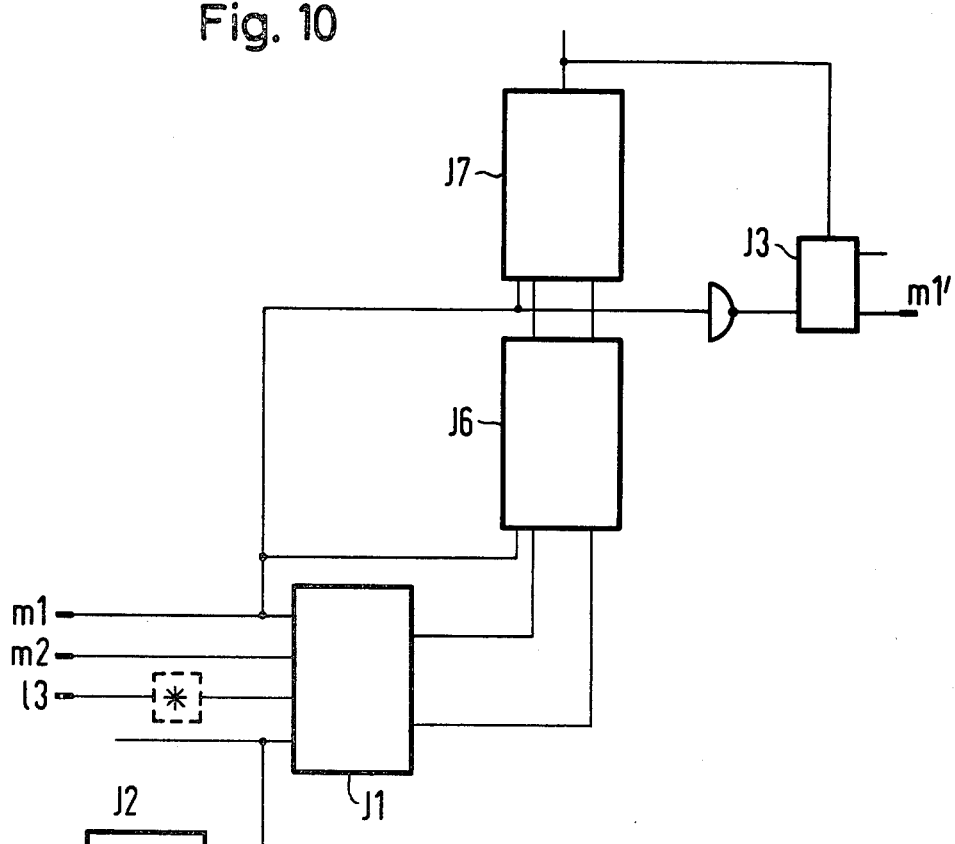
FIGS. 10, 11 and 12 illustrate circuit arrangements required for acceleration of the motor.
Figure 12:
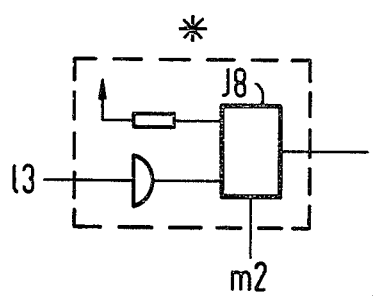

FIGS. 10 and 12 illustrate the circuit arrangement which must be provided between the monostable trigger circuit M1 and the decoder circuit DC in order to be able to control the acceleration of the DC motor in path-dependent fashion.

An oscillator J2 produces a counting pulse train of, e.g. 1 kHz. This counting pulse train is fed to a decoder J1, the design of which can be seen from FIG. 10. The decoder J1 is also connected with the signals m1 from the monostable trigger circuit M1, m2 from the monostable trigger circuit M2, and 1(3) from the optical sensor L3. Here a circuit arrangement as illustrated in FIG. 12 is inserted into the line for the signal 1(3). This circuit ensures that the optical sensor L3 is analyzed only when the signal m2 is present. J8 is a bistable trigger circuit.

The outputs of the decoder I1 are connected to the forward-backward counter which consists of two stages J6 and J7. The output of the counter J6, J7 is connected to a bistable trigger circuit J3, at whose output the signal m1' is emitted, which is fed to the decoder circuit DC. The signal m1' becomes "1" when the signal m1 becomes "1", but is switched back to "zero" when the forward-backward counter J6 and J7 has been reset to the count of "zero".

Figure 11:
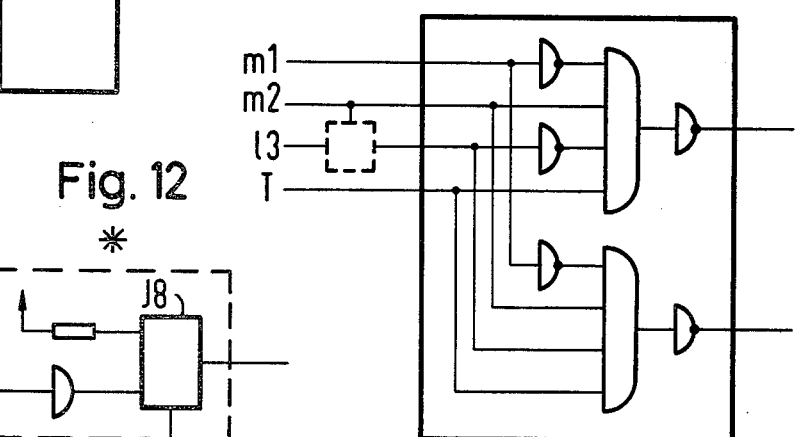

The time during which the counter J6, J7 counts upwards is dependent upon the time which passes until the pulse train disc TK has, during the pivot motion, moved from a position to the optical sensor L3. Then the counter J6, J7 counts backwards again. When this operation is employed in the circuit illustrated in FIG. 4, the circuit (FIGS. 10, 11 and 12) is inserted between the symbolic boxes M1 and DC. As a result, DC are now fed with m1' and m2 instead of m1 and m2.

As the construction of the circuit illustrated in FIGS. 9 to 12 does not constitute the subject of the invention, but is merely to represent one possible mode of practice, the circuit will not be further discussed. The modules employed in the circuit are commercially available.

It will be understood that various modifications of the preferred embodiments can be achieved without departing from the spirit and scope of the invention as described in the following claims, and all such modifications are intended to be covered by this invention.

We claim:

1. An apparatus for developing movements of a shaft about a limited angle and employing a DC motor comprising:
   first and second position indicators located at spaced-apart angular positions relative to the shaft;
   a motor drive having its output coupled to said DC motor to drive the same, means for establishing a direction signal indicative of the direction of rotation of said DC motor;
   said position indicators having means for generating output position signals to indicate an incorrect position of said DC motor;
   a control circuit;
   said direction signals and position signals being coupled to said control circuit and the output of the control circuit being coupled to said motor drive; and
   said control circuit producing, in response to said signals, an acceleration, deceleration and correction signal, said correction signal being developed for pivotal movement in either pivotal direction only when the shaft is in the region of either one of said first and second position indicators.

2. An apparatus in accordance with claim 1 wherein the correction signal is developed in response to the presence of position signals generated by said position indicators.

3. An apparatus in accordance with claim 1 wherein said correction signals are of a lower magnitude than either of said acceleration or deceleration signals.

4. An apparatus in accordance with claim 1 wherein the position indicators comprise a pulse train disc coupled for co-rotation with said shaft, and at least two optical sensors operative in conjunction with said pulse train disc, said pulse train disc having a pulse train window having first and second opposite edges cooperative with the optical sensors such that angular movement of the disc causes the edges of the window to interrupt one or the other of said optical sensors thereby developing position signals.

5. An apparatus in accordance with claim 1 wherein the motor drive comprises an H-circuit employing four power transistors, one of the terminals of the DC motor being connected through the emitter-collector path of one of the power transistors to an operating potential and through the emitter-collector path of a second power transistor to a second operating potential, the other terminal of the DC motor being connected through the emitter collector path of a third power transistor to the first operating potential and through the emitter collector path of the fourth power transistor to the second operating potential, a resistor being connected in parallel with the emitter-collector paths of each of the second and fourth power transistors.

6. An apparatus in accordance with claim 1 wherein said control circuit comprises two monostable trigger circuits and a decoder circuit, the direction signal being fed to the decoder circuit and to the first and second monostable trigger circuits, both monostable trigger circuits being set on one phase for such duration as the DC motor is to be accelerated, the second monostable trigger circuit after reverse of phase of the first monostable trigger circuit remaining set for such time as the DC motor is to be decelerated, said decoder circuit being additionally supplied with said position signals, said position indicators being optical sensors which emit four control signals of which the first control signal occurs whenever acceleration is carried out in the one direction and deceleration in the other direction, and of which the fourth control signal occurs whenever acceleration is carried out in the other direction and deceleration in the one direction, and of which the second control signal occurs whenever the acceleration current is produced in the one direction and the deceleration current is produced in the other direction, and of which the third control signal occurs whenever the deceleration current is produced in the one direction and the acceleration current in the other direction, and that in addition the first control signal and the fourth control signal occurs when forward or backward correction currents respectively are required.

* * * * *